(12) United States Patent
Fulford et al.

(10) Patent No.: US 11,123,617 B2
(45) Date of Patent: Sep. 21, 2021

(54) GOLF CAR ACCESSORY HOLDER

(71) Applicant: Club Car LLC, Evans, GA (US)

(72) Inventors: James Michael Fulford, Evans, GA (US); William David Reeves, Jr., Grovetown, GA (US)

(73) Assignee: CLUB CAR, LLC, Evans, GA (US)

( * ) Notice: Subject to any disclaimer, the term of this patent is extended or adjusted under 35 U.S.C. 154(b) by 0 days.

(21) Appl. No.: 16/549,212

(22) Filed: Aug. 23, 2019

(65) Prior Publication Data
US 2021/0052958 A1    Feb. 25, 2021

(51) Int. Cl.
*A63B 57/20*    (2015.01)
*B60R 9/08*    (2006.01)
*A63B 55/60*    (2015.01)

(52) U.S. Cl.
CPC .............. *A63B 57/20* (2015.10); *B60R 9/08* (2013.01); *A63B 55/61* (2015.10); *A63B 57/203* (2015.10); *A63B 2225/685* (2013.01); *A63B 2225/687* (2013.01)

(58) Field of Classification Search
CPC ..... A45F 2200/0566; A45F 2200/0591; A63B 57/20; A63B 47/00; A63B 47/001
USPC .......... 224/274, 251, 919; D21/796; D3/221, D3/318, 224
See application file for complete search history.

(56) References Cited

U.S. PATENT DOCUMENTS

| | | | |
|---|---|---|---|
| 2,768,775 A | 10/1956 | Houser | |
| 2,846,077 A | 8/1958 | Kozub | |
| 3,206,067 A | 9/1965 | Smith, Jr. et al. | |
| 3,497,118 A | 2/1970 | Najjar | |
| 3,777,933 A | 12/1973 | Joliot | |
| 4,787,632 A * | 11/1988 | Nigrelli | A63B 47/02 294/19.2 |
| 4,971,282 A | 4/1990 | Hufford | |
| 5,358,205 A * | 10/1994 | Starkey | F16B 7/0493 248/220.21 |
| 2006/0091089 A1* | 5/2006 | Christiansen | B62B 5/00 211/70.2 |
| 2009/0277940 A1 | 11/2009 | Cook | |
| 2013/0212898 A1* | 8/2013 | Reynolds | A45C 13/40 34/239 |

* cited by examiner

*Primary Examiner* — Scott T McNurlen
(74) *Attorney, Agent, or Firm* — Edell, Shapiro & Finnan, LLC

(57) ABSTRACT

An accessory holder is provided for golf cars to store accessories like golf balls in an easy to access location from outside of the golf car. For example, the accessory holder may be mounted on a vertical strut supporting the canopy of the golf car. The accessory holder wraps around the strut and has gaps that allow the accessory holder to be mounted onto the strut.

20 Claims, 4 Drawing Sheets

GOLF CAR ACCESSORY HOLDER

BACKGROUND

The present inventions relate generally to golf accessories, and more particularly, to an accessory holder that may be mounted onto a golf car.

Golfing is a well-known sport that often involves the use of a golf car to drive along the course and carry the golfer's equipment. Smaller accessories, such as golf balls, gloves, tees, towels, eyeglasses, phones and two-way radios are usually stored either in pockets of a golf club bag or in compartments in the golf car. For example, most golf cars have a compartment (e.g., a "glove compartment") in the dash of the car store miscellaneous accessories. However, it can be difficult and time-consuming to access these storage locations, particularly in the case of frequently accessed accessories like golf balls, gloves and tees. In the case of the glove compartment in the golf car, it can require leaning into the car and tediously inspecting the compartment to find the desired accessory. This is especially tiresome and time wasting in the case of golf balls, gloves and tees, which are frequently placed in the car and removed again between golf shots.

Thus, it would be desirable to have an accessory holder that is easier for the golfer to access.

SUMMARY

An accessory holder is described that is mounted on a strut of a golf car. Preferably, the strut is a vertical strut extending between the main body of the golf car and the canopy to support the canopy. The accessory holder has sections that wrap partially around strut. Gaps in the accessory holder are provided to slide the accessory holder onto the strut.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
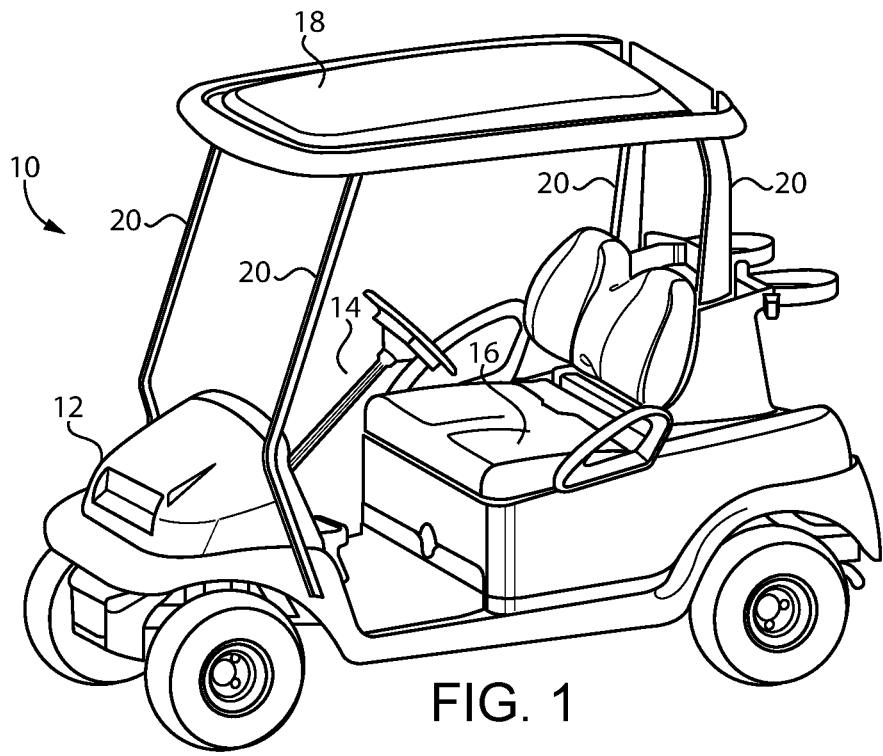
FIG. 1 is a perspective view of a golf car.

Referring now to the figures, and particularly FIG. 1, a golf car 10 is shown. Golf cars 10 are well-known motorized vehicles that are principally designed for driving along a golf course. It is understood that golf cars 10 are not designed for travel along highways like automobiles or other long-distance commuting vehicles. The main body 12 of the golf car 10 typically has an open cabin 14 with a seat 16 for two passengers. The golf car 10 also typically has a canopy 18 above the seat 16 to shade the occupants from the sun. The canopy 18 is supported by vertical struts 20 extending between the main body 12 and the canopy 18. Struts 20 frequently have rectangular, hollow cross-sections and are made of steel or other metal. Most commonly, struts 20 have a 1" square cross-section.

Figure 2:
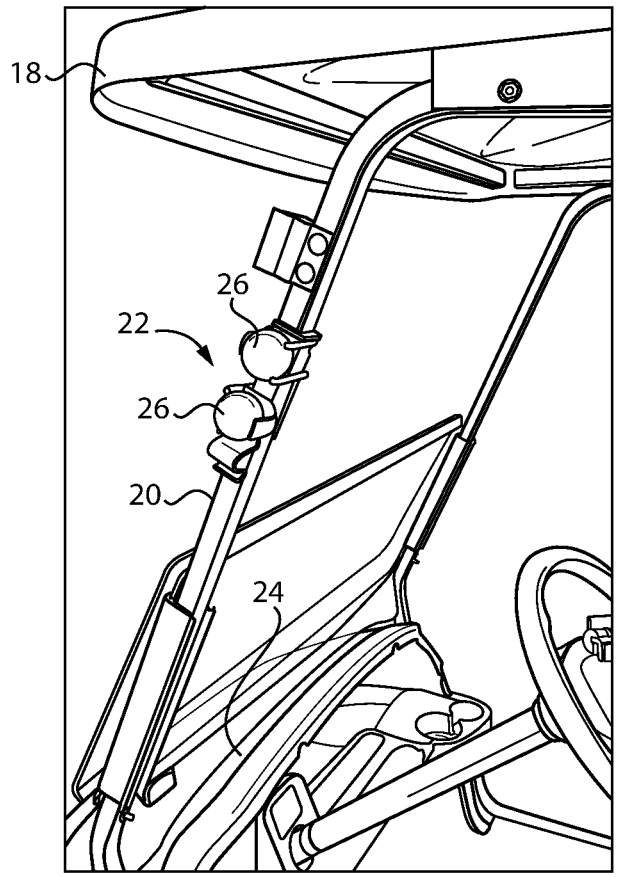
FIG. 2 is a perspective view of an accessory holder mounted onto a strut of the golf car.

As shown in FIG. 2, the golf car 10 may be provided with an accessory holder 22 mounted onto one of the vertical struts 20 between the main body 12 and the canopy 18. Most preferably, the accessory holder 22 is mounted on the front, left strut 20 above the golf car dash 24 to provide easy access for the driver of the golf car 10. As described further below, the accessory holder 22 may be useful to retain a number of different accessories like golf balls 26, gloves, towels, pairs of eyeglasses, phones and two-way radios. Thus, various types of holders may be included on the accessory holder 22 that are adapted for specific accessories. However, as shown in FIG. 2, the accessory holder 22 is especially useful to hold one or more golf balls 26 in an easy to access location from outside of the golf car 10 by the golfer while standing next to the golf car 10.

Figure 3:
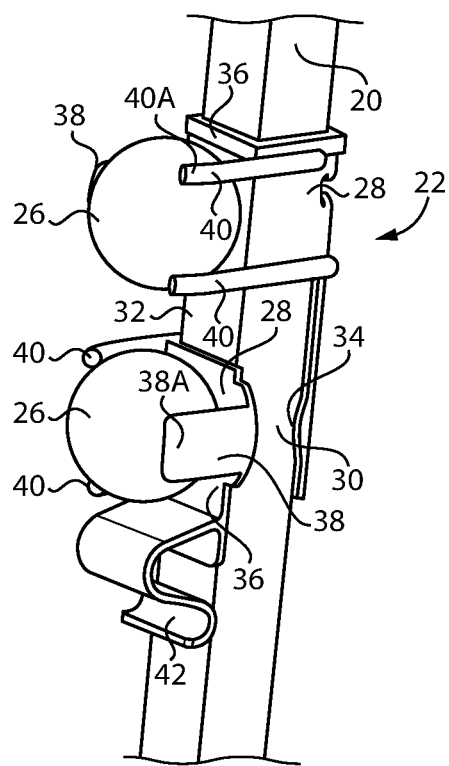
FIG. 3 is a close-up perspective view of the accessory holder mounted onto the strut.
Figure 4:
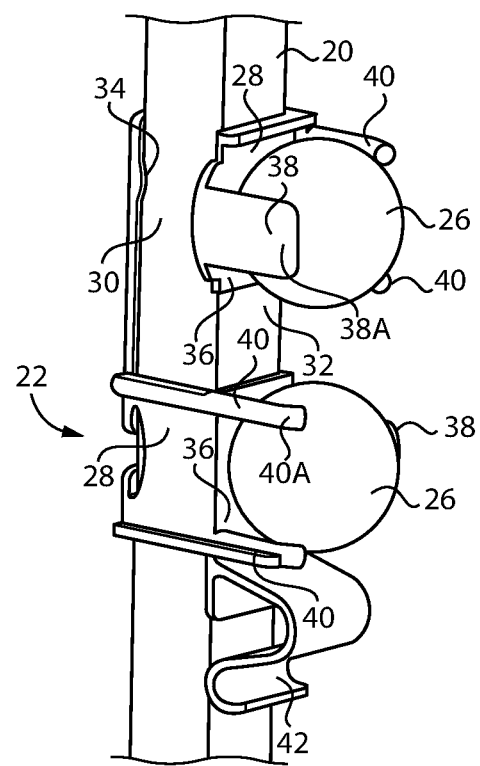
FIG. 4 is a perspective view of FIG. 3 showing the other side of the accessory holder.

FIGS. 3-4 show opposite side perspective views of one embodiment of the accessory holder 22. As shown, the accessory holder 22 has top and bottom sections 28 that each wrap around a portion of the strut 20. Each of the sections 28 also have a circumferential gap 30 between the edges of the sections 28. As shown, the circumferential gap 30 of the top section 28 and the bottom section 28 are on opposite sides of the strut 20. As explained below, the circumferential gaps 30 are sized so that the strut 20 can slide through the gaps 30 when mounting the accessory holder 22 onto the strut 20. The accessory holder 22 also includes an axial gap 32 between the top and bottom sections 28 that is also sized so that the strut 20 can slide therethrough.

Figure 5:
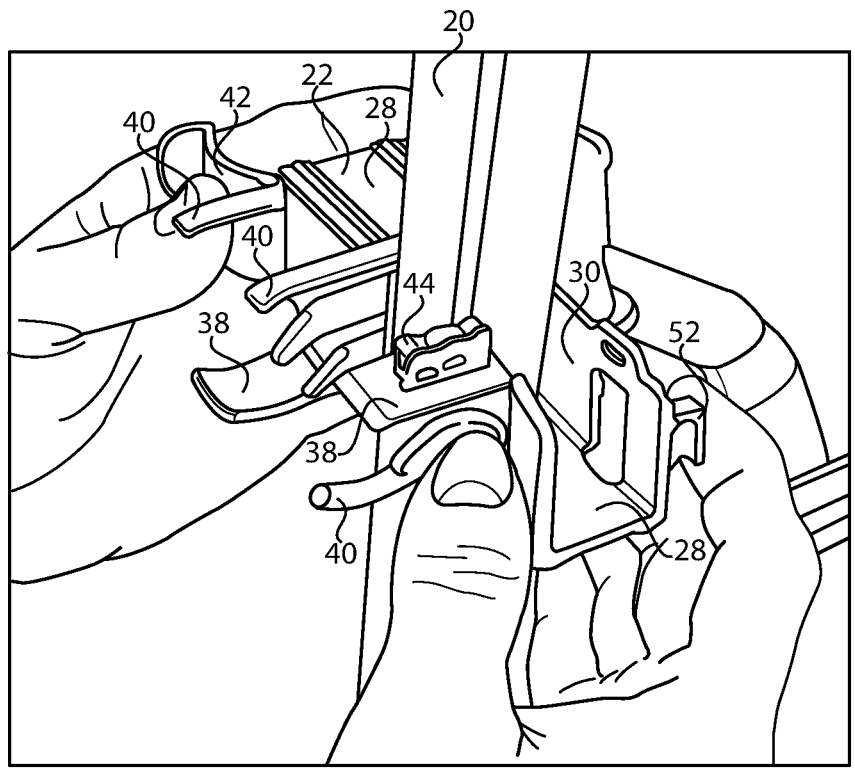
FIG. 5 is a perspective view of the accessory holder being mounted onto the strut.

As shown in FIG. 5, the accessory holder 22 is mounted onto the strut 20 by rotating the accessory holder 22 so that it is oriented transversely relative to the strut 20. The accessory holder 22 is then moved toward the strut 20 so that the strut 20 slides through the axial gap 32 between the top and bottom sections 28. Once the strut 20 is slid all the way through the axial gap 32, the accessory holder 22 can be rotated into the axial orientation of FIGS. 3-4 by sliding the strut 20 through the circumferential gaps 30 of the top and bottom sections 28.

As shown in FIGS. 3-4, it may be desirable for the top and bottom sections 28 to have one or more snaps 34 to retain the accessory holder 22 in the axial orientation. Preferably, each of the circumferential gaps 30 has a snap 34 along an edge thereof. When the accessory holder 22 is mounted onto the strut 20 and rotated into the axial orientation, the snaps 34 flex away from the strut 20 as the strut 20 slides through the circumferential gaps 30 and past the snaps 34. Once the strut 20 passes all the way through the circumferential gaps 30, the snaps 34 snap back into place and wrap around a portion of the strut 20 to retain the accessory holder 22 in the axial orientation. Although the accessory holder 22 may be made of various materials, it may be desirable to make the accessory holder 22 out of plastic so that the snaps 34 and other features have sufficient flexibility to function as desired. It may also be desirable for the entire accessory holder 22 to be a molded plastic part.

In addition to the accessory holder 22 being flexible to snap onto the strut 20 of the golf car 10, the accessory holder 22 may have various flexible holders to snap different accessories onto the accessory holder 22. FIGS. 3-4 illustrate two different types of flexible holders that may be used for golfing accessories. For example, it may be desirable for the accessory holder 22 to have one or more golf ball holders 36. As shown, one golf ball holder 36 may be located on each of the top and bottom sections 28. Although various golf ball holders 36 may be provided, the illustrated embodiment has a larger projection 38 (e.g., wider) on one side and two smaller projections 40 on the other side. The larger projection 38 and the smaller projections 40 may each have an inwardly angled outer end portion 38A, 40A that angles inward toward the golf ball 26. Thus, when the golf ball 26 is pushed into the holder 36, one or more of the projections 38, 40 flexes to snap the golf ball 26 into the holder 36. Preferably, all of the projections 38, 40 are flexible and flex during insertion and removal of the golf ball 26. Because of the size of the larger projection 38, however, the larger projection 38 may be stiffer than each of the smaller projections 40 and may flex less. Due to the shape of the two smaller projections 40 and the spaced apart location of the projections 40, each of the smaller projections 40 may flex in two different directions when the golf ball 26 is inserted and removed. That is, the smaller projections 40 may flex outward away from the larger projection 38 and may also flex away from each other. This may minimize creep set that can occur with plastic parts over time.

The accessory holder 22 may also have a glove holder 42. The glove holder 42 may be a spring arm 42 that is angled toward the strut 20 and may be flexed away from the strut 20 to allow the glove to be inserted between the spring arm 42 and the strut 20. After insertion, the spring arm 42 snaps back and is biased against the glove to retain it between the spring arm 42 and the strut 20. It has been found that, in addition to providing a convenient storage location for a golf glove, the glove holder 42 is also useful in keeping a glove dry between shots, since the glove may be put in the holder 42 after a shot, and the glove is then exposed to bypassing air as the golf car 10 is driven to the next shot.

Figures 6, 7:
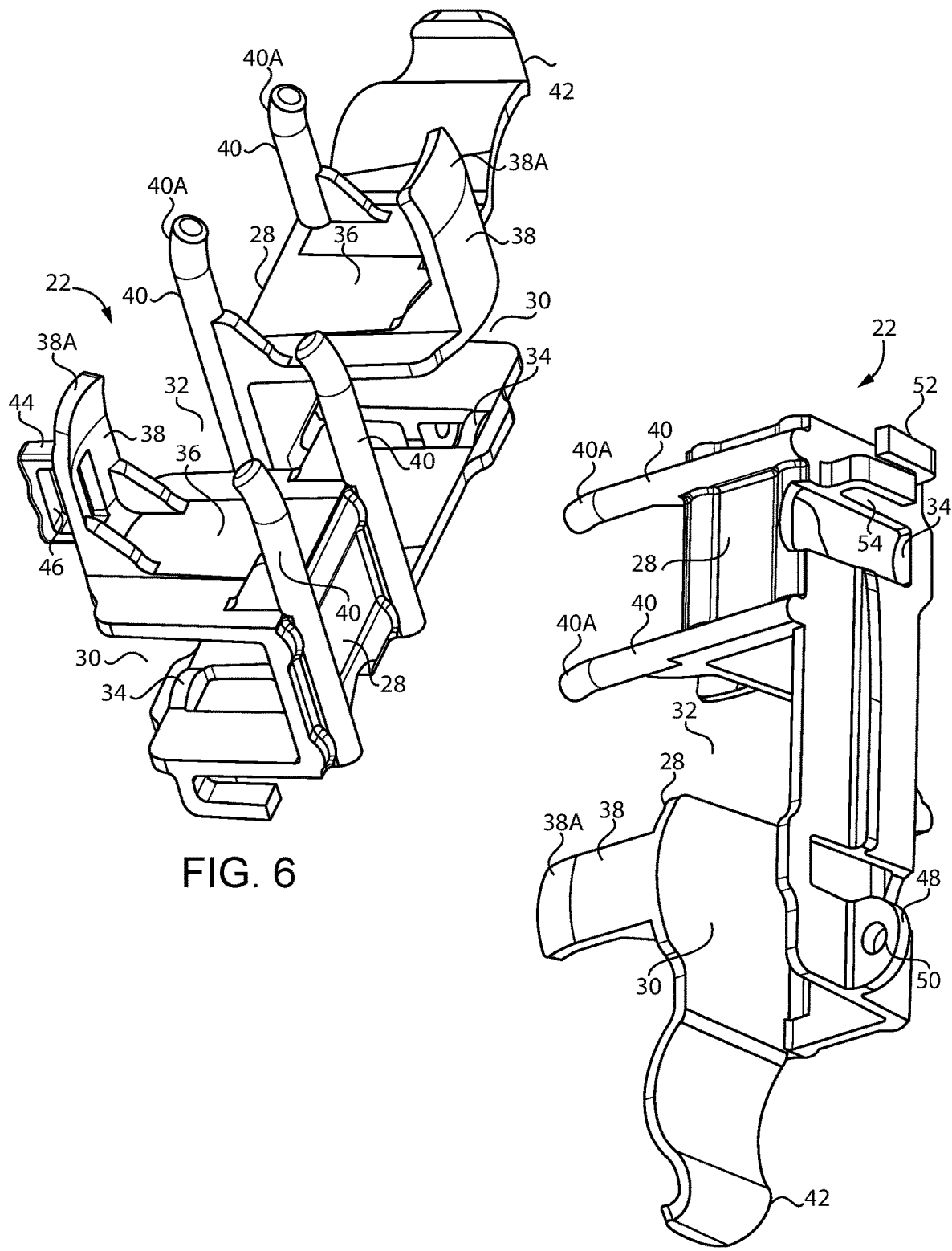
FIG. 6 is a perspective view of another accessory holder.
FIG. 7 is a perspective view of FIG. 6 showing the other side of the accessory holder.
Figure 8:
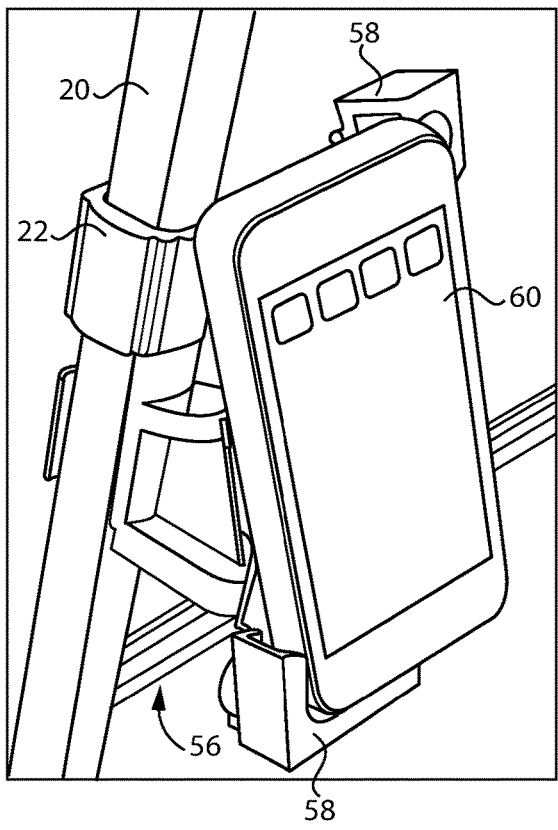
FIG. 8 is a front perspective view of an accessory holder with a phone holder.
Figure 9:
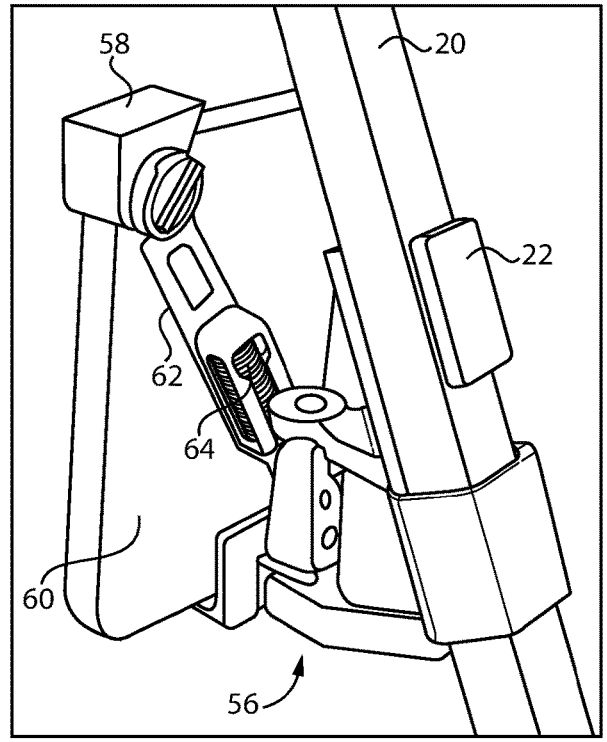
FIG. 9 is a rear perspective view of FIG. 8 showing the backside of the phone holder.

Another version of the accessory holder 22 is shown in FIGS. 6-7. As shown, additional holders may also be included, such as a holder 44 for golf tees, a holder 48 for a towel, and a holder 52 for a pair of eyeglasses like sunglasses. The golf tee holder 44 may have an open slot 46 therethrough that tees may be slid through without the heads of the tees being able to slide through. The towel holder 48 may be a ring 50 that may be tied to a string that is connected to a towel. The eyeglass holder 52 may have an opening 54 therethrough sized to accept the arm of a pair of eyeglasses. As shown, it may be desirable for some of the accessories to be on the opposite side of the accessory holder 22 from other accessories. Thus, when the accessory holder 22 is mounted as shown in FIG. 2, some of the accessories will face into the cabin 14 of the golf car 10 and some accessories will face outward. As shown in FIGS. 6-7, it may be desirable for the accessory holder 22 to have multiple holders 36, 42, 44 for at least a golf ball 26, a glove and a tee. As shown in FIGS. 8-9, it may also be desirable for the accessory holder 22 to have a holder 56 for a phone. As shown, the phone holder 56 may have corner grips 58 (or edge grips 58) that are adjustable relative to each other to grip different sized phones 60. As shown in FIG. 9, the edge grips 58 have a telescoping connection 62 therebetween and a spring 64 to bias the edge grips 58 towards each other.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An accessory holder that mounts onto a strut of a golf car, comprising:
   a first section wrapping around a portion of a circumference of the strut, the first section comprising a first circumferential gap and a first golf ball holder extending from a front side of the first section;
   a second section wrapping around another portion of the circumference of the strut, the second section comprising a second circumferential gap and a second golf ball holder extending from a front side of the second section; and
   an axial gap disposed between the front side of the first section and the front side of the second section so that the axial gap provides a gap between adjacent edges of the first golf ball holder and the second golf ball holder,
   wherein the first and second circumferential gaps are disposed on opposite sides, such that the accessory holder is mounted onto the strut by sliding the accessory holder transversely over the strut through the axial gap and rotating the accessory holder about the axial gap to slide the first and second sections over the strut through the first and second circumferential gaps.

2. The accessory holder according to claim 1, further comprising an additional holder for an accessory including a golf ball, a glove, a tee, a towel, a pair of eyeglasses, a phone or a two-way radio.

3. The accessory holder according to claim 1, wherein at least one of the first golf ball holder and the second golf ball holder is flexible.

4. The accessory holder according to claim 1, further comprising a tee holder extending from the first golf ball holder or the second golf ball holder.

5. The accessory holder according to claim 4, wherein the tee holder comprises a slot sized to slide a tee therethrough and the slot being smaller than a head of the tee.

6. The accessory holder according to claim 1, wherein the accessory holder is made of plastic.

7. The accessory holder according to claim 1, further comprising a snap disposed along an edge of the first or second circumferential gap, the snap flexing away from the strut as the accessory holder is rotated to slide the first and second sections over the strut through the first and second circumferential gaps, and the snap thereafter snapping around the portion of the strut to retain the accessory holder in an axial orientation.

8. The accessory holder according to claim 7, wherein the snap is a first snap disposed along an edge of the first circumferential gap and the accessory holder further comprises:
   a second snap on an edge of the second circumferential gap, the second snap flexing away from the strut as the accessory holder is rotated to slide the first and second sections over the strut through the first and second circumferential gaps, and the second snap thereafter snapping around the strut to retain the accessory holder in the axial orientation.

9. The accessory holder according to claim 1, wherein the strut has a rectangular cross-section.

10. The accessory holder according to claim 1, wherein the strut has a one-inch square cross-section.

11. The accessory holder according to claim 1, wherein the strut is a vertical strut between a main body of the golf car and a canopy of the golf car.

12. The accessory holder according to claim 1, wherein the first golf ball holder comprises at least two flexible projections to snap a golf ball into the first golf ball holder and to retain the golf ball in the first golf ball holder.

13. The accessory holder according to claim 12, wherein the two flexible projections are on a same side of the golf ball and are separated from each other, each of the two flexible projections comprising an inwardly angled portion that wraps around a portion of the golf ball.

14. The accessory holder according to claim 12, wherein the first golf ball holder further comprises a projection on an opposite side of the golf ball from the two flexible projections, the projection being wider and stiffer than each of the two flexible projections.

15. The accessory holder according to claim 1, further comprising a glove holder comprising a spring arm that biases against a glove to retain it.

16. The accessory holder according to claim 15, wherein the spring arm extends toward the strut such that the spring arm flexes away from the strut to allow the glove to be inserted therebetween and snaps toward the strut to retain the glove between the spring arm and the strut.

17. The accessory holder according to claim 1, further comprising an additional holder for a phone, the additional holder comprising edge grips to grip the phone and a telescoping connection and a spring between the edge grips to bias the edge grips towards each other.

18. A golf car comprising:
a strut; and
an accessory holder comprising:
first and second sections wrapping around portions of a circumference of the strut, the first and second sections comprising first and second circumferential gaps, respectively, disposed on opposite sides;
a first golf ball holder extending from a front side of the first section;
a second golf ball holder extending from a front side of the second section; and
an axial gap disposed between the front side of the first section and the front side of the second section so that the axial gap provides a gap between adjacent edges of the first golf ball holder and the second golf ball holder
wherein, the accessory holder is mounted onto the strut by sliding the accessory holder transversely over the strut through the axial gap and rotating the accessory holder about the axial gap to slide the first and second sections over the strut through the first and second circumferential gaps.

19. The golf car according to claim 18, wherein the accessory holder is made of plastic, and further comprises:
a first snap disposed along an edge of the first circumferential gap; and
a second snap disposed along an edge of the second circumferential gap, wherein the first snap and the second snap each flex away from the strut as the accessory holder is rotated axially to slide the first and second sections over the strut through the first and second circumferential gaps, and thereafter, the first snap and the second snap each snap around the portions of the strut to retain the accessory holder in an axial orientation.

20. The golf car according to claim 18, wherein the strut has a one-inch square cross-section, and the strut is a vertical strut between a main body of the golf car and a canopy of the golf car.

* * * * *